United States Patent
Kajimoto et al.

(10) Patent No.: US 9,925,918 B2
(45) Date of Patent: Mar. 27, 2018

(54) ON-VEHICLE APPARATUS AND ON-VEHICLE SYSTEM

(71) Applicants: FUJITSU TEN LIMITED, Kobe-shi, Hyogo (JP); HONDA MOTOR CO., LTD., Tokyo (JP)

(72) Inventors: Nobuaki Kajimoto, Kobe (JP); Takanori Fujiwara, Kobe (JP); Xin Sun, Kobe (JP); Shimpei Moriyama, Kobe (JP); Tomohiko Torii, Kobe (JP); Kazuo Fukazawa, Wako (JP)

(73) Assignees: DENSO TEN LIMITED, Kobe-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/014,872

(22) Filed: Feb. 3, 2016

(65) Prior Publication Data
US 2016/0236615 A1 Aug. 18, 2016

(30) Foreign Application Priority Data

Feb. 13, 2015 (JP) ................................ 2015-026773

(51) Int. Cl.
| | |
|---|---|
| *B60Q 1/00* | (2006.01) |
| *B60Q 9/00* | (2006.01) |
| *H04L 12/40* | (2006.01) |
| *H02J 13/00* | (2006.01) |
| *G08B 21/18* | (2006.01) |

(52) U.S. Cl.
CPC ............ *B60Q 9/00* (2013.01); *H02J 13/0003* (2013.01); *H04L 12/40* (2013.01); *H04L 12/40039* (2013.01); *G08B 21/182* (2013.01); *H04L 2012/40215* (2013.01); *H04L 2012/40273* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 2012/0217796 A1* | 8/2012 | Morand | H04L 12/40039 307/9.1 |
| 2013/0165100 A1* | 6/2013 | Moran | H04M 1/0256 455/418 |
| 2016/0105309 A1* | 4/2016 | Van Nieuwenhuyze | H04B 5/0031 370/254 |

FOREIGN PATENT DOCUMENTS

| | | | |
|---|---|---|---|
| JP | 2009-267853 | * | 11/2009 |
| JP | 2009-267853 A | | 11/2009 |
| JP | 2009267853 | * | 11/2009 |

\* cited by examiner

*Primary Examiner* — Julie Lieu
(74) *Attorney, Agent, or Firm* — Oliff PLC

(57) ABSTRACT

An on-vehicle apparatus according to an embodiment includes a communication unit that communicates with another on-vehicle apparatus, and a controller that is communicatively coupled to the other on-vehicle apparatus through the communication unit and performs an operation mode in which the controller controls a control target when a supply voltage value is equal to or larger than a first threshold. The controller is able to communicate with the other on-vehicle apparatus through the communication unit when the supply voltage value is equal to or larger than a second threshold which is smaller than the first threshold.

7 Claims, 5 Drawing Sheets

ON-VEHICLE APPARATUS AND ON-VEHICLE SYSTEM

CROSS-REFERENCE TO RELATED APPLICATION

This application is based upon and claims the benefit of priority of the prior Japanese Patent Application No. 2015-026773, filed on Feb. 13, 2015, the entire contents of which are incorporated herein by reference.

FIELD

The embodiment discussed herein is directed to an on-vehicle apparatus and an on-vehicle system.

BACKGROUND

Conventional vehicles such as automobiles have various electronic controllers (ECUs) mounted thereon including, for example, a running-control apparatus, a light control apparatus, a door control apparatus, an air-conditioner control apparatus, a car navigation apparatus, and an audio control apparatus as on-vehicle apparatuses.

These on-vehicle apparatuses are communicatively coupled to each other through, for example, a controller area network (CAN) communications, thereby exchanging information among the on-vehicle apparatuses (refer to Japanese Laid-open Patent Publication No. 2009-267853, for example).

However, the conventional on-vehicle apparatuses each have individually set values of a voltage to stop the operation or the control. Therefore, the on-vehicle apparatus may be disabled from communicating with the other on-vehicle apparatuses when the battery voltage of the vehicle decreases.

In Japanese Laid-open Patent Publication No. 2009-267853, a technology has been developed where a low voltage range having low reliability is provided between a recommended minimum operation-voltage and an operation stop voltage. However, the objective of this setting is to identify a cause of inability to receive a normal signal from an on-vehicle apparatus. In addition, with the technology, an on-vehicle apparatus has to operate with the low voltage range having low reliability.

Furthermore, with the technology disclosed in Japanese Laid-open Patent Publication No. 2009-267853, a representative on-vehicle apparatus has to store therein information of the recommended minimum operation-voltage of other on-vehicle apparatuses and detect the on-vehicle apparatus having a voltage value smaller than the recommended minimum operation-voltage, leading to complicated control.

SUMMARY

According to an aspect of an embodiment, an on-vehicle apparatus includes a communication unit and a controller. The communication unit communicates with another on-vehicle apparatus. The controller is communicatively coupled to the other on-vehicle apparatus through the communication unit and performs an operation mode in which the controller controls a control target when a supply voltage value is equal to or larger than a first threshold. The controller is able to communicate with the other on-vehicle apparatus through the communication unit when the supply voltage value is equal to or larger than a second threshold which is smaller than the first threshold.

BRIEF DESCRIPTION OF DRAWINGS

The present invention can be appreciated more completely and advantages thereof could be easily understood in the description of an embodiment below with reference to the accompanying drawings.

DESCRIPTION OF EMBODIMENT

A preferred embodiment of an on-vehicle apparatus and an on-vehicle system according to the present invention will be explained with reference to accompanying drawings. The scope of the present invention is not limited to the embodiment.

Figure 1A:
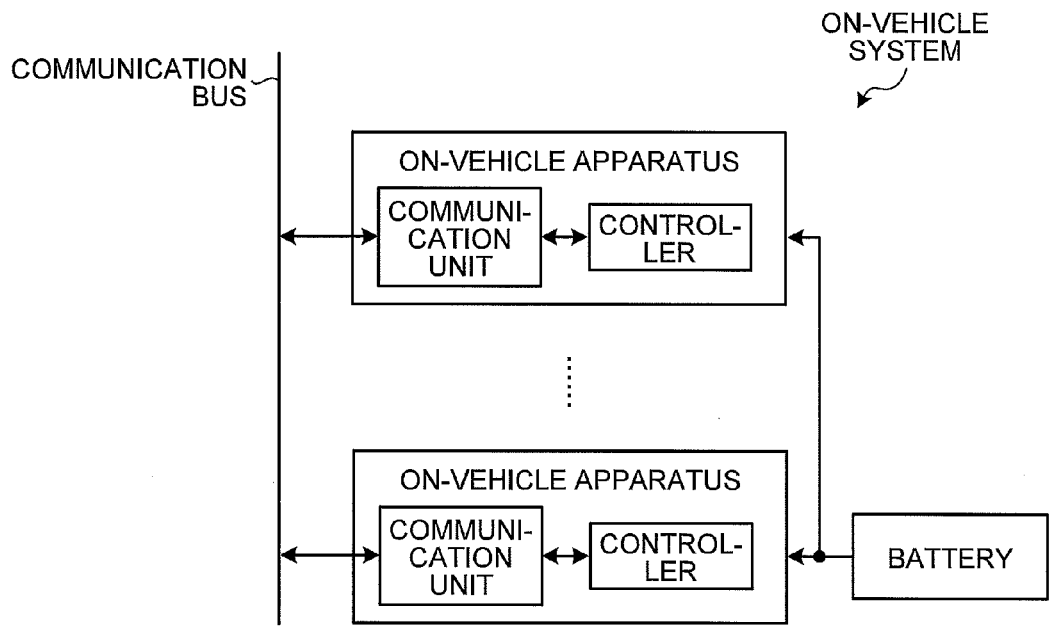
FIG. 1A is a diagram illustrating an example of an on-vehicle system including an on-vehicle apparatus according to an embodiment of the present invention.

FIG. 1A is a diagram illustrating an example of the on-vehicle system including the on-vehicle apparatus according to the embodiment of the present invention. As illustrated in FIG. 1A, the on-vehicle system according to the embodiment includes a plurality of on-vehicle apparatuses mounted on a vehicle. The on-vehicle apparatuses are communicatively coupled to each other through an on-vehicle network.

The on-vehicle network is, for example, a controller area network (CAN), and another network may be used. Examples of the on-vehicle apparatus include a running-control apparatus, a light control apparatus, a roof control apparatus, a door control apparatus, an air-conditioner control apparatus, an audio control apparatus, and a car navigation apparatus and so on.

The on-vehicle apparatus includes a communication unit and a controller. The communication unit is coupled to the on-vehicle network (for example, communication bus, refer to FIG. 1A). The controller is communicatively coupled to other on-vehicle apparatuses through the communication unit and controls a control target. Examples of the control target include a headlight and a hazard light, when the on-vehicle apparatus is a light control apparatus. When the on-vehicle apparatus is the audio control apparatus, examples of the control target include a speaker and a display.

These on-vehicle apparatuses operate with a battery voltage Vbat as a supply voltage. If the battery voltage Vbat decreases, appropriate control of the control target is sometimes impossible. To avoid this issue, a voltage Vth1 at which the control target can be controlled (hereinafter referred to as the minimum control voltage Vth1) is thus determined for each of the on-vehicle apparatuses.

Figure 1B:
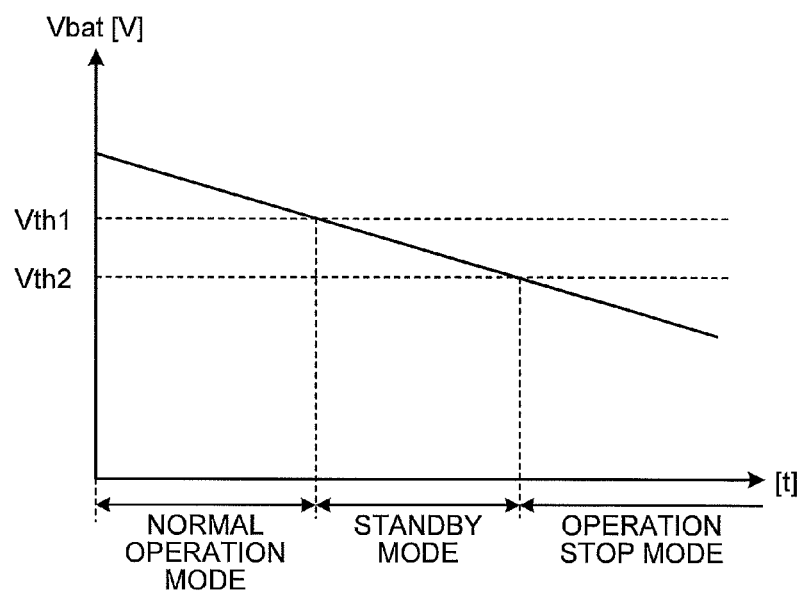
FIG. 1B is a diagram illustrating an example of the relation between the state of the on-vehicle apparatus and a battery voltage according to the embodiment.

FIG. 1B is a diagram illustrating an example of the relation between the state of the on-vehicle apparatus illustrated in FIG. 1A and the battery voltage. As illustrated in FIG. 1B, if the value of the battery voltage Vbat serving as the supply voltage is equal to or larger than the minimum control voltage Vth1 (an example of a first threshold), the on-vehicle apparatus is in a normal operation mode, in which the on-vehicle apparatus is able to control the control target.

If the value of the battery voltage Vbat is smaller than the minimum control voltage Vth1, the on-vehicle apparatus does not control the control target. This operation prevents the control target from being controlled in an unstable state.

If the value of the battery voltage Vbat is equal to or larger than a given voltage Vth2 which is smaller than the minimum control voltage Vth1 (hereinafter referred to as a minimum communication voltage Vth2), the on-vehicle apparatus is in a standby mode, in which the on-vehicle apparatus is able to communicate with other on-vehicle apparatuses but does not control the control target.

In the standby mode, the on-vehicle apparatus monitors the battery voltage Vbat. The on-vehicle apparatus checks whether the battery voltage Vbat is in the voltage range for the standby mode (Vth1>Vbat≥Vth2), thereby determining whether the standby mode can be maintained.

If the battery voltage Vbat is smaller than the minimum communication voltage Vth2, the on-vehicle apparatus is in an operation stop mode, in which the on-vehicle apparatus does not control the control target or communicate with other on-vehicle apparatuses.

As described above, even if the battery voltage Vbat decreases to a voltage at which the control target is not controlled, the on-vehicle apparatus is able to communicate with other on-vehicle apparatuses. Accordingly, for example, the controller in the on-vehicle apparatus is able to communicate with other on-vehicle apparatuses in the standby mode appropriately.

For example, the on-vehicle apparatus is able to acquire information from other on-vehicle apparatuses and reply to inquiries from other on-vehicle apparatuses. Setting the same value of the minimum communication voltage Vth2 to the on-vehicle apparatuses achieves communication with other on-vehicle apparatuses more appropriately.

Figure 2:
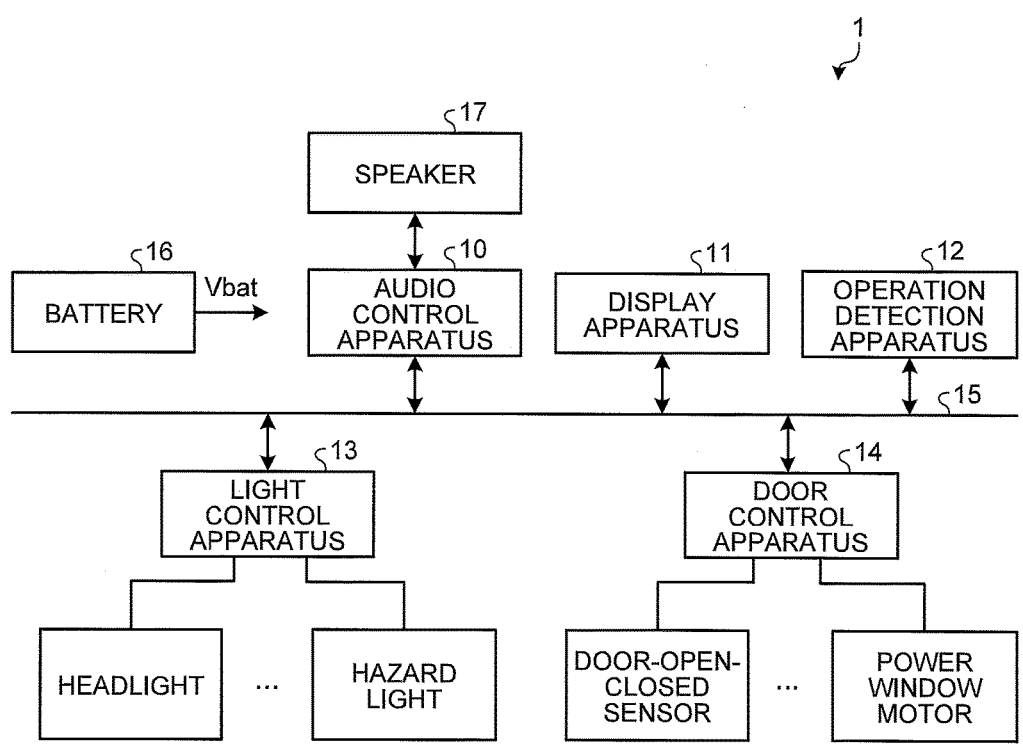
FIG. 2 is a diagram illustrating an example of the detailed configuration of the on-vehicle system illustrated in FIG. 1.

The following describes an example of the detailed configuration of the on-vehicle system according to the embodiment of the present invention. FIG. 2 is a diagram illustrating an example of the detailed configuration of the on-vehicle system illustrated in FIG. 1.

As illustrated in FIG. 2, the on-vehicle system 1 includes on-vehicle apparatuses including an audio control apparatus 10, a display apparatus 11, an operation detection apparatus 12, a light control apparatus 13, and a door control apparatus 14. These on-vehicle apparatuses are coupled to a communication bus 15 of the on-vehicle network. The on-vehicle network is, as described above, a network such as a CAN. Each of the on-vehicle apparatuses operates with a battery voltage Vbat that is a voltage supplied from a battery 16 as a supply voltage.

The audio control apparatus 10 includes an operation unit (not illustrated) and executes playback processing of content of radio, music, movies, and television images based on a user's input through the operation unit. The audio control apparatus 10 controls a speaker 17 to output acoustic signals and the display apparatus 11 to display images thereon.

The operation detection apparatus 12 detects, for example, the state of various types of switches disposed in the vehicle and notifies other on-vehicle apparatuses of the detection result through the communication bus 15. The light control apparatus 13 controls, for example, ON and OFF of various types of light such as the headlight and the hazard light based on the detection result of a switch (e.g., an operation switch of the headlight or the hazard light) notified from the operation detection apparatus 12.

The door control apparatus 14 controls, for example, a power window motor and the like based on the detection result of a switch (e.g., an operation switch of the power window) notified from the operation detection apparatus 12. The door control apparatus 14 notifies other on-vehicle apparatuses of, for example, the open or closed state of the doors of the vehicle detected by a door-open-closed sensor through the communication bus 15.

Figure 3:
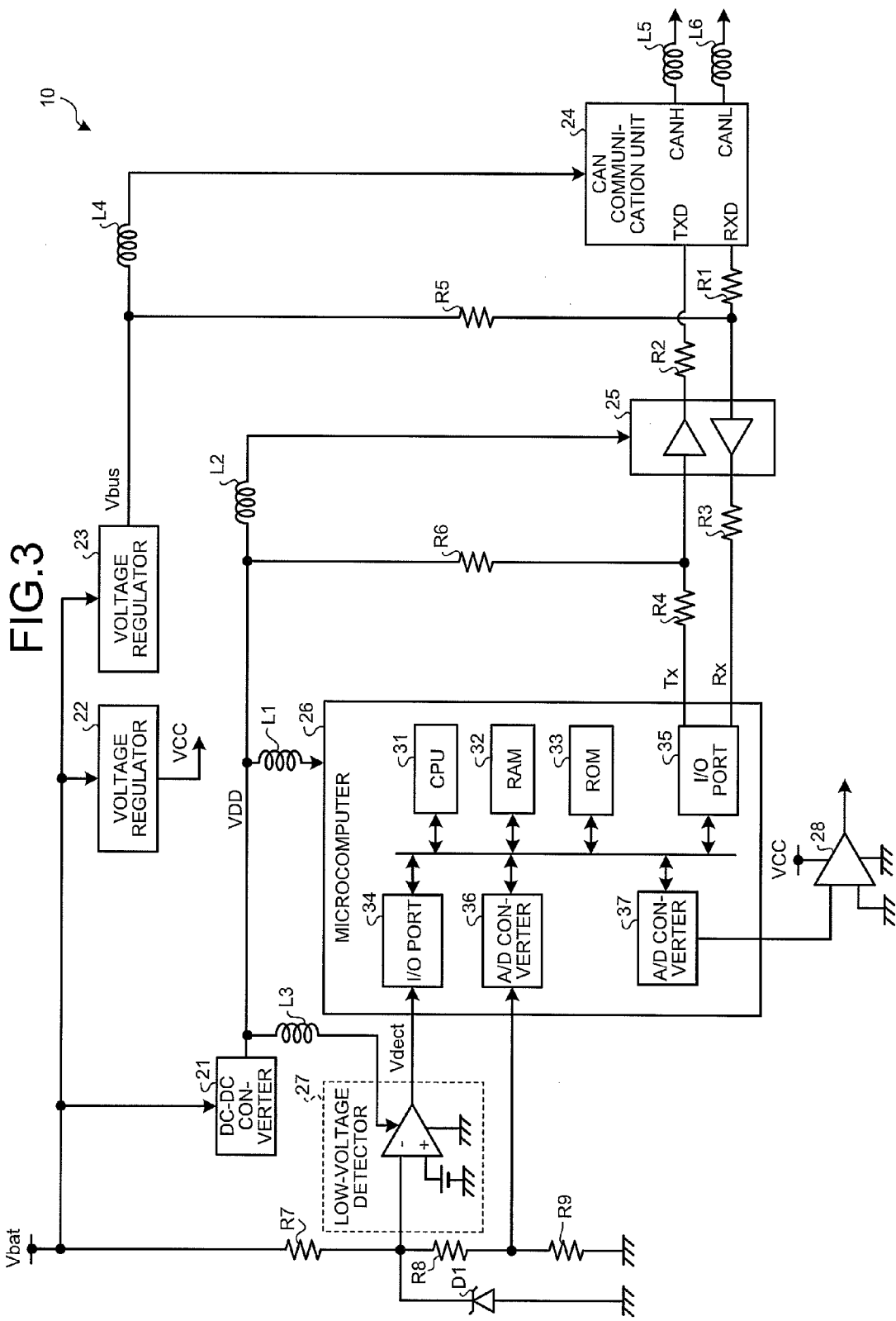
FIG. 3 is a diagram illustrating an example of the detailed configuration of the on-vehicle apparatus illustrated in FIG. 2.

The following describes an example of the configuration of the audio control apparatus 10 as an example of the on-vehicle apparatuses. FIG. 3 is a diagram illustrating an example of the detailed configuration of the audio control apparatus 10.

As illustrated in FIG. 3, the audio control apparatus 10 includes, a direct-current to direct-current (DC-DC) converter 21, voltage regulators 22 and 23, a CAN communication unit 24, a buffer circuit 25, a microcomputer 26, a low-voltage detector 27, an amplifier 28, resistors R1 to R9, coils L1 to L6, and a Zener diode D1. The audio control apparatus 10 includes a disk drive, a radio tuner circuit, and other components (not illustrated) that read data from a medium such as a compact disc (CD).

The DC-DC converter 21 converts the battery voltage Vbat into a voltage VDD (e.g., 3.3 V) that is a digital supply voltage. The voltage VDD is supplied to the buffer circuit 25, the microcomputer 26, and the low-voltage detector 27 through the coils L1, L2, and L3.

The voltage regulator 22 converts the battery voltage Vbat into a voltage VCC (e.g., 8.0 V) that is an analog supply voltage. The voltage VCC is supplied to the amplifier 28 through a coil (not illustrated), for example. The voltage regulator 23 converts the battery voltage Vbat into a communication bus voltage Vbus. The voltage Vbus is supplied to the CAN communication unit 24 through the coil L4, for example.

The CAN communication unit 24 is coupled to the communication bus 15 through the coils L5 and L6 and exchanges data with a CAN communication unit in other on-vehicle apparatuses. The CAN communication unit 24 includes input and output terminals CANH and CANL and exchanges signals with the communication bus 15 by using the dual differential voltage technology.

The CAN communication unit 24 includes a serial transmission terminal RXD and a serial receiving terminal TXD, and exchanges serial data with the microcomputer 26 through the buffer circuit 25 and the resistors R1 to R4. The resistors R1 to R4 have a function of a damping resistor and the resistors R5 and R6 have a function as a pull-up resistor.

For example, if the input and output terminals CANH and CANL receive signals based on the CAN transmission scheme (hereinafter referred to as CAN signals) input through the communication bus 15, the CAN communication unit 24 outputs the serial signals Rx corresponding to the received signals from the serial transmission terminal RXD.

If the microcomputer 26 inputs serial signals Tx to the serial receiving terminal TXD, the CAN communication unit 24 outputs the CAN signals corresponding to the input signals from the input and output terminals CANH and CANL to the communication bus 15.

The above-described coils L1 to L6 or the resistors R1 to R4 are disposed so as to remove high frequency noise, for example. If there is only a small influence of high frequency noise, the coils and the resistors are not necessarily disposed.

The microcomputer 26 includes a central processing unit (CPU) 31, a random access memory (RAM) 32, a read only memory (ROM) 33, input and output (I/O) ports 34 and 35, and analog-to-digital (A/D) converters 36 and 37.

Figure 4:
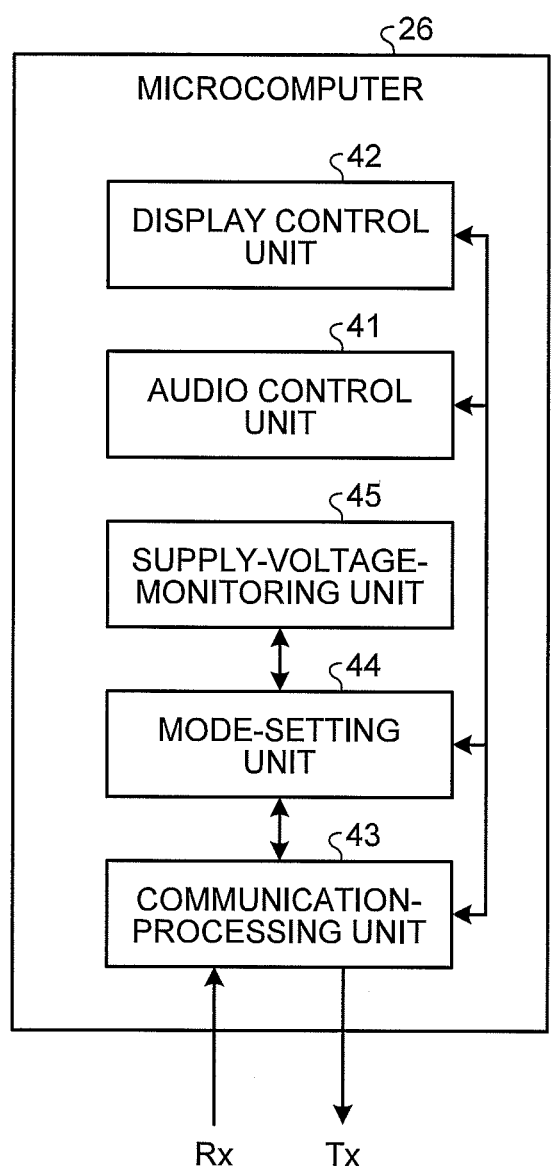
FIG. 4 is a diagram illustrating an example of the functional block diagram of a controller in the on-vehicle apparatus illustrated in FIG. 3.

The CPU 31 reads a computer program stored in the ROM 33 and executes the computer program using the RAM 32 as a working area. This operation enables the microcomputer 26 to function as a controller, for example, as illustrated in FIG. 4, as an audio control unit 41, a display control unit 42, a communication-processing unit 43, a mode-setting unit 44, and a supply-voltage-monitoring unit 45. FIG. 4 is a diagram illustrating an example functional block diagram of the controller that is the microcomputer 26.

The audio control unit 41, for example, reads data from storage media (e.g., an optical disc such as a compact disc (CD) and a digital versatile disc (DVD) in response to an input operation by a passenger of the vehicle through an input unit (not illustrated) of the audio control apparatus 10 (refer to FIG. 2) or the display apparatus 11 (refer to FIG. 2). The audio control unit 41 outputs acoustic signals corresponding to the read data to the amplifier 28 (refer to FIG. 3). The amplifier 28 amplifies the acoustic signals output from the audio control unit 41 and outputs them to the speaker 17.

The audio control unit 41 includes an A/D converter 37 (refer to FIG. 3) through which the audio control unit 41 converts the acoustic data generated through the processing by the CPU 31, for example, into analog signals, and outputs them to the amplifier 28 (refer to FIG. 3).

The display control unit 42 generates, for example, an operation screen in response to an input operation by the passenger of the vehicle through the input unit of the audio control apparatus 10 or the display apparatus 11 (refer to FIG. 2). The display control unit 42 sends the information on the operation screen to the display apparatus 11 through the communication-processing unit 43. The audio control unit 41 and the display control unit 42 are able to acquire the information of the input operation to the display apparatus 11, from the display apparatus 11 through the communication-processing unit 43.

The communication-processing unit 43 includes the I/O port 35 (refer to FIG. 3). When the communication-processing unit 43 receives the serial signals Rx from the CAN communication unit 24 (refer to FIG. 3) through the I/O port 35, the communication-processing unit 43 extracts the information included in the serial signals Rx. The communication-processing unit 43 then notifies the corresponding destination out of the audio control unit 41, the display control unit 42, and the mode-setting unit 44, of the information.

If the communication-processing unit 43 has the information to be sent to other on-vehicle apparatuses through the CAN communication unit 24 (refer to FIG. 3), the communication-processing unit 43 converts the information into the serial signals Tx and outputs them to the CAN communication unit 24. The communication-processing unit 43 is able to, for example, convert the information acquired from the audio control unit 41, the display control unit 42, and the mode-setting unit 44 into the serial signals Tx and output it to the CAN communication unit 24.

The I/O port 35 is an interrupt port. When the communication-processing unit 43 receives the serial signals Rx from the CAN communication unit 24 through the I/O port 35, the communication-processing unit 43 notifies the mode-setting unit 44 of the information of the interrupt (hereinafter referred to as a CAN interrupt).

The CAN interrupt is performed if the light control apparatus 13 or the door control apparatus 14, for example, sends information (e.g., a status and a command). If a headlight or a hazard light is turned on, for example, the light control apparatus 13 sends the CAN signals indicating the above-described state to the communication bus 15. This operation enables the CAN communication unit 24 to input the serial signals Rx to the I/O port 35.

If the door-open-closed sensor detects that a door is opened or closed, for example, the door control apparatus 14 sends the CAN signals indicating that the door is opened or closed to the communication bus 15. This operation enables the CAN communication unit 24 to input the serial signals Rx to the I/O port 35.

As described above, the CAN interrupt is performed if a headlight or a hazard light is operated, or a door is opened or closed. The description is provided merely for exemplary purpose and not limiting. The CAN interrupt is performed when information exists that is sent from other on-vehicle apparatuses to the communication bus 15. For another example, the CAN interrupt is performed when a not-illustrated on-vehicle apparatus inputs a signal indicating a request for lighting a light-emitting diode (LED) and the like of the on-vehicle apparatus (e.g., in a welcome mode).

The mode-setting unit 44 sets a mode out of the normal operation mode, the standby mode, and the operation stop mode. If the mode-setting unit 44 sets the normal operation mode, the microcomputer 26 performs the normal operation. For example, the audio control unit 41 and the display control unit 42 move to the state in which they control the respective control targets (e.g., the speaker 17 or the display apparatus 11), and the communication-processing unit 43 is in the state in which the communication-processing unit 43 is able to communicate with other on-vehicle apparatuses.

If the mode-setting unit 44 sets the standby mode, the audio control unit 41 and the display control unit 42 move to the stopped state, but the communication-processing unit 43 is still in the state in which it is able to communicate with other on-vehicle apparatuses. The state is, for example, the standby state of the microcomputer 26.

If the mode-setting unit 44 sets the operation stop mode, the audio control unit 41, the display control unit 42, and the communication-processing unit 43 are in the stopped state. The state is, for example, the deep standby state of the microcomputer 26.

Figure 5:
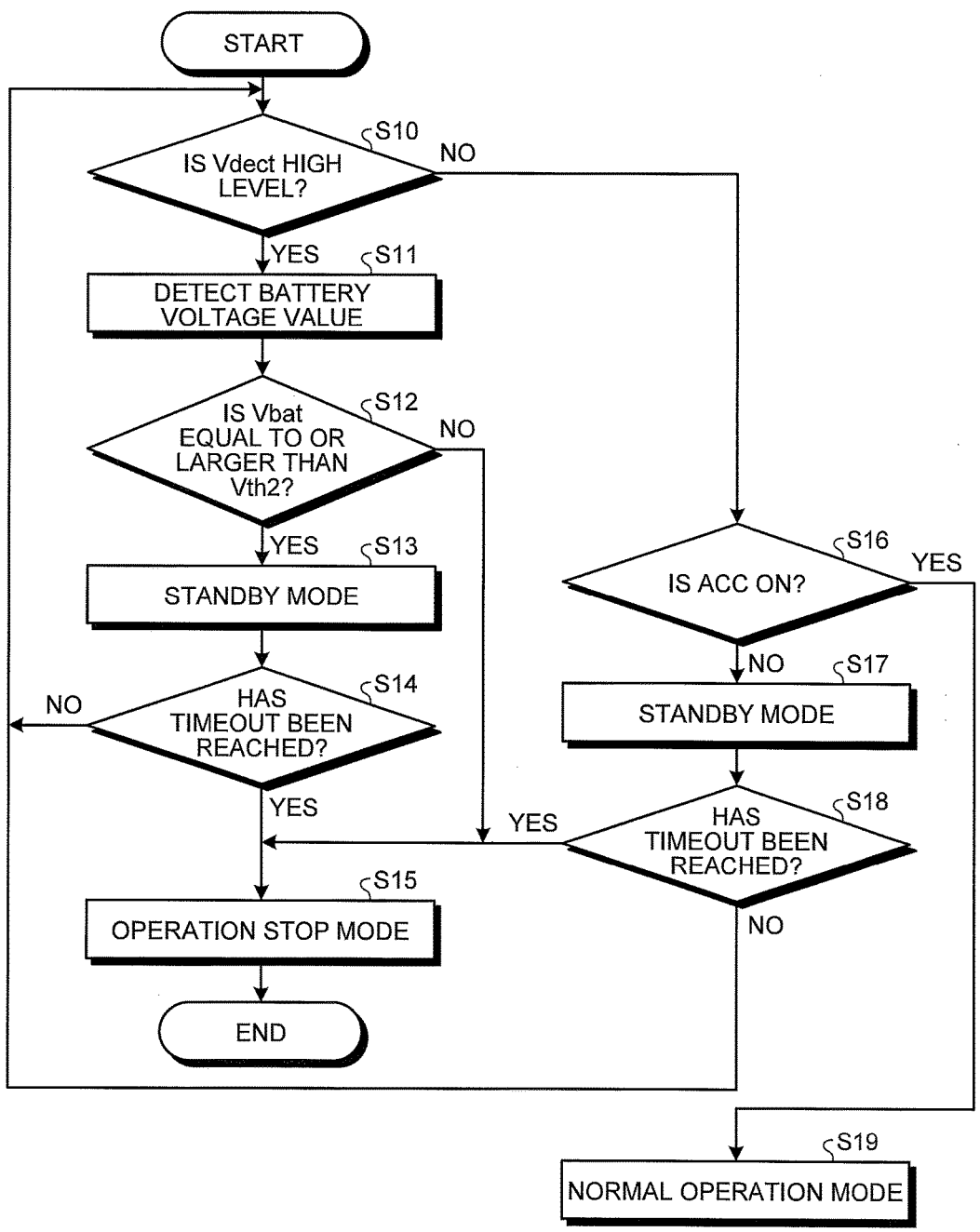
FIG. 5 is a flowchart illustrating an example of processing of the on-vehicle apparatus illustrated in FIGS. 3 and 4.

The mode-setting unit 44 sets a mode out of the normal operation mode, the standby mode, and the operation stop mode in accordance with the value of the battery voltage Vbat. The following describes the setting of the mode in detail. FIG. 5 is a flowchart illustrating an example of the processing by the audio control apparatus 10. Note that the flowchart illustrated in FIG. 5 starts with the operation stop mode.

If a CAN interrupt is performed in the operation stop mode, as illustrated in FIG. 5, the mode-setting unit 44, determines whether the detection result Vdect by the low-voltage detector 27 is High level (Step S10). The processing at Step S10 is performed, for example, after the CAN interrupt starts operating the CPU 31 (refer to FIG. 3) to monitor the I/O port 34 (refer to FIG. 3).

The low-voltage detector 27 includes a comparator (refer to FIG. 3) that compares the battery voltage Vbat with the minimum control voltage Vth1. If the battery voltage Vbat is equal to or larger than the minimum control voltage Vth1, the low-voltage detector 27 outputs a Low-level detection result Vdect. This configuration and operation of the low-voltage detector 27 enables the mode-setting unit 44 to quickly check whether the battery voltage Vbat is equal to or larger than the minimum control voltage Vth1 through the I/O port 34.

If the battery voltage Vbat is smaller than the minimum control voltage Vth1, the low-voltage detector 27 outputs a High-level detection result Vdect (an example of the low-voltage detection signals). As described above, if the battery voltage Vbat is smaller than the minimum control voltage Vth1, the low-voltage detector 27 detects that the battery voltage Vbat is a low voltage.

The minimum control voltage Vth1 is set, for example, to a value larger than the voltage value at which the quality of the audio volume output from the audio control unit 41 is not able to be maintained. The minimum control voltage Vth1 is also set, for example, to a value smaller than the voltage value at which an erroneous detection of the low-voltage detector 27 occurs due to a sudden decrease of the voltage during the maximum audio volume.

If the mode-setting unit 44 determines that the detection result Vdect by the low-voltage detector 27 is High level (Yes at Step S10), the mode-setting unit 44 causes the supply-voltage-monitoring unit 45 (refer to FIG. 4) to move from the stopped state to the operation state. This operation enables the supply-voltage-monitoring unit 45 to detect the value of the battery voltage Vbat (Step S11). As described above, if a CAN interrupt is performed and the battery voltage Vbat is smaller than the minimum control voltage Vth1, the supply-voltage-monitoring unit 45 starts monitoring the battery voltage Vbat.

The supply-voltage-monitoring unit 45 includes the A/D converter 36 (refer to FIG. 3). The A/D converter 36 converts the voltage for detection generated by the resistor R7 to R9 and the Zener diode D1 illustrated in FIG. 3 into digital data. The CPU 31 detects the value of the battery voltage Vbat based on the digital data.

The resistor R7 to R9 are coupled to each other in serial, and the battery voltage Vbat is applied to both the ends thereof. The voltage at both ends of the Zener diode D1 is maintained to the Zener voltage of the Zener diode D1. The voltage for detection generated by the resistors R8 and R9 dividing the Zener voltage, is input to the A/D converter 36.

The mode-setting unit 44 determines whether the value of the battery voltage Vbat detected by the supply-voltage-monitoring unit 45 is equal to or larger than the minimum communication voltage Vth2 (Step S12). If the value of the battery voltage Vbat is equal to or larger than the minimum communication voltage Vth2 (Yes at Step S12), the mode-setting unit 44 sets the microcomputer 26 to the standby mode (Step S13).

If the minimum communication voltage Vth2 is set to a value equal to or larger than the lower one between the voltage VDD and the voltage Vbus, for example, and thus the value of the battery voltage Vbat is equal to or larger than the minimum communication voltage Vth2, the microcomputer 26, the buffer circuit 25, and the CAN communication unit 24 are able to operate.

As described above, if a CAN interrupt is performed and the battery voltage Vbat is smaller than the minimum control voltage Vth1 and equal to or larger than the minimum communication voltage Vth2, the microcomputer 26 is set to the standby mode.

Accordingly, the microcomputer 26 is able to communicate with other on-vehicle apparatuses through the CAN communication unit 24. Even if the on-vehicle system 1 includes any other on-vehicle apparatus having the minimum control voltage Vth1 smaller than the minimum control voltage Vth1 of the audio control apparatus 10, the other on-vehicle apparatus is able to communicate with the audio control apparatus 10 properly.

The CAN interrupt causing the microcomputer 26 to move to the standby mode prevents the standby mode from being continued until the CAN interrupt is performed even if the battery voltage Vbat is equal to or larger than the minimum communication voltage Vth2. This operation achieves reducing the battery power consumption.

If the microcomputer 26 is set to the standby mode and the communication-processing unit 43 receives the serial signals Rx from another on-vehicle apparatus through the CAN communication unit 24, the communication-processing unit 43 is able to send the CAN signals corresponding to the serial signals Tx including the information indicating that the microcomputer 26 is in the standby mode, to the other on-vehicle apparatuses. This operation notifies other on-vehicle apparatuses of the information indicating that the microcomputer 26 is in the standby mode. If the microcomputer 26 is set to the standby mode, the supply-voltage-monitoring unit 45 continues the processing of detecting the value of the battery voltage Vbat (the process at Step S11).

If the communication-processing unit 43 receives the serial signals Rx from another on-vehicle apparatus through the CAN communication unit 24, the communication-processing unit 43 is able to acquire the information from the serial signals Rx and store the information in a storage unit therein. This operation enables the audio control unit 41 and the display control unit 42 to perform control based on the information acquired during the standby mode if the microcomputer 26 is moved from the standby mode to the normal operation mode.

Subsequently, the mode-setting unit 44 determines whether a timeout has been reached (Step S14). For example, if any next CAN interrupt is not performed before a certain time (e.g., 5 seconds) elapses from a certain CAN interrupt, or before a certain time (e.g., 5 seconds) elapses from the last CAN interrupt, the mode-setting unit 44 determines that a timeout has been reached. The mode-setting unit 44 is also able to determine that the timeout has been reached, for example, if the communication-processing unit 43 receives a sleep request from another on-vehicle apparatus.

If the mode-setting unit 44 determines that the timeout has not been reached yet at Step S14 (No at Step S14), the mode-setting unit 44 moves the process sequence to step S10. If the mode-setting unit 44 determines that the timeout has been reached (Yes at Step S14), the mode-setting unit 44 sets the microcomputer 26 to the operation stop mode (Step S15), and ends the process illustrated in FIG. 5. This operation stops the monitoring of the battery voltage Vbat by the supply-voltage-monitoring unit 45 and the mode determination process by the mode-setting unit 44.

If the value of the battery voltage Vbat is smaller than the minimum communication voltage Vth2 at Step S12 (No at Step S12), the mode-setting unit 44 executes the processing at Step S15 and ends the process illustrated in FIG. 5. This operation achieves quickly moving to the operation stopped state even if a CAN interrupt is performed and the value of the battery voltage Vbat is smaller than the minimum communication voltage Vth2, thereby reducing the battery power consumption.

If the mode-setting unit 44 determines that the detection result Vdect by the low-voltage detector 27 is not High level at Step S10 (No at Step S10) before the timeout is reached, the mode-setting unit 44 determines whether an accessary (ACC) is turned on (Step S16).

The state of the ACC is detected, for example, by the operation detection apparatus 12 (refer to FIG. 2) and notified to the audio control apparatus 10 through the communication bus 15. The mode-setting unit 44 is able to acquire the information indicating the state of the ACC through the CAN communication unit 24 and the communication-processing unit 43, and determines whether the ACC is turned on based on the information. The ACC is the state in which, for example, electrical equipment including audio equipment is operated. The ACC is on while the engine switch of the vehicle is located in the ACC position.

If the mode-setting unit 44 determines that the ACC is off (No at Step S16), the mode-setting unit 44 sets the microcomputer 26 to the standby mode (Step S17) in the same manner as at Step S13.

Subsequently, the mode-setting unit 44 determines whether the timeout has been reached (Step S18) in the same manner as at Step S14. If the mode-setting unit 44 determines that the timeout has not been reached yet (No at Step S18), the mode-setting unit 44 moves the process sequence to step S10. If the mode-setting unit 44 determines that the timeout has been reached (Yes at Step S18), the mode-setting unit 44 moves the process sequence to step S15. This operation sets the microcomputer 26 to the operation stop mode.

If the mode-setting unit 44 determines that the ACC is on at Step S16 (Yes at Step S16), the mode-setting unit 44 sets the microcomputer 26 to the normal operation mode (Step S19). As described above, if a CAN interrupt is performed and the battery voltage Vbat is equal to or larger than the minimum control voltage Vth1, and the ACC is on, the microcomputer 26 is set to the normal operation mode.

After the microcomputer 26 is moved to the normal operation mode and if the detection result Vdect by the low-voltage detector 27 is found to be High level, the mode-setting unit 44 is able to move the process sequence to Step S11, and also able to move to the operation stop mode. Moving to the operation stop mode achieves reducing the battery power consumption until the CAN interrupt is performed.

For example, if the battery voltage Vbat frequently repeats fluctuating between a value equal to or larger than the minimum communication voltage Vth2 and a value smaller than the minimum communication voltage Vth2 (a predetermined number of times or more in a predetermined time period), the mode-setting unit 44 can raise the value of the minimum communication voltage Vth2. This operation prevents the process illustrated in FIG. 5 from being repeated frequently.

The mode-setting unit 44 is also able to set the minimum communication voltage Vth2 based on the setting information sent from, for example, other on-vehicle apparatuses or the operation detection apparatus 12 to the communication-processing unit 43 through the communication bus 15. This operation achieves, for example, readily setting the minimum communication voltage Vth2 to be used in common among the on-vehicle apparatuses.

In the above-described example, controlling the audio control apparatus 10 has been specifically described. The description is provided merely for exemplary purpose and not limiting. Alternatively, the configuration illustrated in FIG. 3 (excluding the amplifier 28) and the process illustrated in FIG. 5 may also be applied to the on-vehicle apparatuses such as the display apparatus 11, the light control apparatus 13, and the door control apparatus 14, in the same manner as the audio control apparatus 10.

On this occasion, the on-vehicle apparatuses may have different values of the minimum control voltage Vth1 and different values of the minimum communication voltage Vth2 from each other. Alternatively, setting the same value of the minimum communication voltage Vth2 for all of the on-vehicle apparatuses achieves communication with on-vehicle apparatuses more appropriately.

The above-described supply-voltage-monitoring unit 45 detects the battery voltage Vbat by using the A/D converter 36. The description is provided merely for exemplary purpose and not limiting. In the same manner as the low-voltage detector 27 illustrated in FIG. 3, the supply-voltage-monitoring unit 45 may have a comparator that compares a reference voltage (the minimum communication voltage Vth2) with the battery voltage Vbat. This configuration eliminates the A/D converter 37 from the microcomputer 26.

Note that the battery voltage Vbat decreases when the amount of the electric charges accumulated in the battery 16 is small, or when the engine of the vehicle is started. Therefore, for example, the mode-setting unit 44 may raise the value of the minimum communication voltage Vth2 in association with the decrease of the battery voltage Vbat, thereby reducing the battery power consumption.

The mode-setting unit 44 may also lower the value of the minimum communication voltage Vth2 for a certain time period after the ACC has been turned on, thereby extending the voltage range in the standby mode when starting the engine. This operation achieves communication with other on-vehicle apparatuses more appropriately.

The on-vehicle apparatus and the on-vehicle system according to the embodiment of the present invention achieves communication with other on-vehicle apparatuses more appropriately if the battery voltage of the vehicle decreases.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle apparatus comprising:
    a communication unit that communicates with another on-vehicle apparatus; and
    a controller that is communicatively coupled to the other on-vehicle apparatus through the communication unit and performs an operation mode in which the controller controls a control target when a supply voltage value is equal to or larger than a first threshold, wherein
    the controller does not control the control target and is able to communicate with the other on-vehicle apparatus through the communication unit when the supply voltage value is smaller than the first threshold and is equal to or larger than a second threshold which is smaller than the first threshold.

2. The on-vehicle apparatus according to claim 1, wherein:
    the controller comprises a voltage monitoring unit that starts monitoring the supply voltage value when a signal corresponding to a signal sent from the other on-vehicle apparatus is input from the communication unit during an operation stop mode in which control of the control target and transmission of a signal from the controller to the other on-vehicle apparatus through the communication unit are both stopped, and the communication unit can only receive signals in the operation stop mode.

3. The on-vehicle apparatus according to claim 2, wherein the controller causes the voltage monitoring unit to stop monitoring the supply voltage value and performs the operation stop mode when the value of the supply voltage monitored by the voltage monitoring unit is smaller than the second threshold.

4. The on-vehicle apparatus according to claim 2, wherein the controller causes the voltage monitoring unit to continue monitoring the supply voltage value and performs a standby mode in which the communication with the other on-vehicle apparatus is possible through the communication unit, when the value of the supply voltage monitored by the voltage monitoring unit is smaller than the first threshold and equal to or larger than the second threshold.

5. The on-vehicle apparatus according to claim 4, wherein the controller causes the voltage monitoring unit to stop monitoring the supply voltage value and performs the operation stop mode, when the signal corresponding to the signal sent from the other on-vehicle apparatus is not input from the communication unit for a predetermined time period after the controller moves to the standby mode.

6. The on-vehicle apparatus according to claim 2, further comprising a low-voltage detector that outputs a low-voltage detection signal when the supply voltage value is smaller than the first threshold, wherein
the voltage monitoring unit starts monitoring the supply voltage value when the low-voltage detection signal is output from the low-voltage detector.

7. An on-vehicle system comprising:
a plurality of on-vehicle apparatuses, wherein
one of the on-vehicle apparatuses comprises
   a communication unit that communicates with another of the on-vehicle apparatuses; and
   a controller that is communicatively coupled to the other on-vehicle apparatus through the communication unit and performs an operation mode in which the controller controls a control target when a supply voltage value is equal to or larger than a first threshold, and
   the controller does not control the control target and is able to communicate with the other on-vehicle apparatus through the communication unit when the supply voltage value is smaller than the first threshold and is equal to or larger than a second threshold which is smaller than the first threshold.

* * * * *

UNITED STATES PATENT AND TRADEMARK OFFICE
CERTIFICATE OF CORRECTION

PATENT NO. : 9,925,918 B2
APPLICATION NO. : 15/014872
DATED : March 27, 2018
INVENTOR(S) : Nobuaki Kajimoto et al.

It is certified that error appears in the above-identified patent and that said Letters Patent is hereby corrected as shown below:

On the Title Page

Column 1, Item (73): delete "DENSO TEN LIMITED, Kobe-shi (JP)" and insert --FUJITSU TEN LIMITED, Kobe-shi (JP)--.

Signed and Sealed this
Tenth Day of March, 2020

Andrei Iancu
*Director of the United States Patent and Trademark Office*